United States Patent
Hayashi et al.

(10) Patent No.: US 7,483,568 B2
(45) Date of Patent: Jan. 27, 2009

(54) MULTI-GRADATION MONOCHROMATIC IMAGE DISPLAY METHOD, MULTI-GRADATION MONOCHROMATIC IMAGE DISPLAY DEVICE, COMPUTER, MONOCHROMATIC DISPLAY DEVICE, RE-CONVERSION ADAPTER, AND VIDEO CARD

(75) Inventors: Shigeo Hayashi, Ueda (JP); Kazuaki Kiuchi, Ueda (JP); Tatumi Naganuma, Ueda (JP)

(73) Assignee: Totoku Electric Co., Ltd., Tokyo (JP)

( * ) Notice: Subject to any disclaimer, the term of this patent is extended or adjusted under 35 U.S.C. 154(b) by 447 days.

(21) Appl. No.: 11/243,904

(22) Filed: Oct. 5, 2005

(65) Prior Publication Data

US 2006/0023967 A1  Feb. 2, 2006

Related U.S. Application Data

(63) Continuation of application No. PCT/JP03/09897, filed on Aug. 4, 2003.

(30) Foreign Application Priority Data

Apr. 14, 2003  (WO) .................. PCT/JP03/04753

(51) Int. Cl.
  *G06K 9/00*  (2006.01)
  *G06F 13/00*  (2006.01)
(52) U.S. Cl. ...................................... 382/167
(58) Field of Classification Search ................ 382/162, 382/164, 165, 167, 172; 345/589, 600–604; 358/515, 518, 521, 523, 525
See application file for complete search history.

(56) References Cited

U.S. PATENT DOCUMENTS

| | | | | |
|---|---|---|---|---|
| 5,576,723 | A * | 11/1996 | Asprey | 345/3.1 |
| 5,990,864 | A * | 11/1999 | DeAguiar et al. | 345/600 |
| 6,574,004 | B1 * | 6/2003 | Jacob et al. | 358/1.13 |
| 2006/0023967 | A1 * | 2/2006 | Hayashi et al. | 382/276 |

FOREIGN PATENT DOCUMENTS

| | | |
|---|---|---|
| JP | 5-298418 | 11/1993 |
| JP | 2001-34232 | 2/2001 |
| JP | 2001-154653 | 6/2001 |
| JP | 2002-99267 | 4/2002 |

* cited by examiner

*Primary Examiner*—Amir Alavi
(74) *Attorney, Agent, or Firm*—Jordan and Hamburg LLP

(57) ABSTRACT

A monochromatic image of which the number of gradation levels (for example, 1024 levels) is greater than that (for example, 256) of a monochromatic image viably handled by an operating system (OS) (13) is converted into a color image which is then received by the OS (13). The color image to be handled by the OS (13) is embraced by the number of available colors (for example, 16,777,216) and can thus be released out directly. The color image released from the OS (13) is then converted into a monochromatic image of which the number of gradation levels (for example, 1021 or 1024) is greater than that (for example, 256) of a monochromatic image viably handled by the OS (13) before displayed. Accordingly, the monochromatic image can be displayed at multiple gradation levels which exceed the gradation limit of any conventional operating system without drastically modifying the hardware or software.

31 Claims, 8 Drawing Sheets

Fig. 2 monochromatic/color conversion table

|  |  | monochromatic<br>gradation level | color<br>RGB value |
|---|---|---|---|
| x r g b | | x r g b | |
| lut[0] = 0, 0, 1 | | lut[999] = 255, 255, 214 | |
| lut[1] = 1, 0, 1 | | lut[1000] = 255, 255, 216 | |
| lut[2] = 2, 0, 0 | | lut[1001] = 255, 255, 218 | |
| lut[3] = 3, 0, 0 | | lut[1002] = 255, 255, 220 | |
| lut[4] = 3, 0, 2 | | lut[1003] = 255, 255, 222 | |
| lut[5] = 4, 0, 1 | | lut[1004] = 255, 255, 224 | |
| lut[6] = 5, 0, 1 | | lut[1005] = 255, 255, 226 | |
| lut[7] = 6, 0, 0 | | lut[1006] = 255, 255, 228 | |
| lut[8] = 7, 0, 0 | | lut[1007] = 255, 255, 230 | |
| lut[9] = 7, 0, 2 | ... ... ... | lut[1008] = 255, 255, 232 | |
| lut[10] = 8, 0, 1 | | lut[1009] = 255, 255, 234 | |
| lut[11] = 9, 0, 1 | | lut[1010] = 255, 255, 236 | |
| lut[12] = 10, 0, 0 | | lut[1011] = 255, 255, 238 | |
| lut[13] = 11, 0, 0 | | lut[1012] = 255, 255, 240 | |
| lut[14] = 11, 0, 2 | | lut[1013] = 255, 255, 242 | |
| lut[15] = 12, 0, 1 | | lut[1014] = 255, 255, 244 | |
| lut[16] = 13, 0, 1 | | lut[1015] = 255, 255, 246 | |
| lut[17] = 14, 0, 0 | | lut[1016] = 255, 255, 248 | |
| lut[18] = 15, 0, 0 | | lut[1017] = 255, 255, 250 | |
| lut[19] = 15, 0, 2 | | lut[1018] = 255, 255, 252 | |
| lut[20] = 16, 0, 1 | | lut[1019] = 255, 255, 254 | |
| lut[21] = 17, 0, 1 | | lut[1020] = 255, 255, 255 | |
| lut[22] = 18, 0, 0 | | lut[1021] = 255, 255, 255 | |
| lut[23] = 19, 0, 0 | | lut[1022] = 255, 255, 255 | |
| lut[24] = 19, 0, 2 | | lut[1023] = 255, 255, 255 | |

Fig. 3

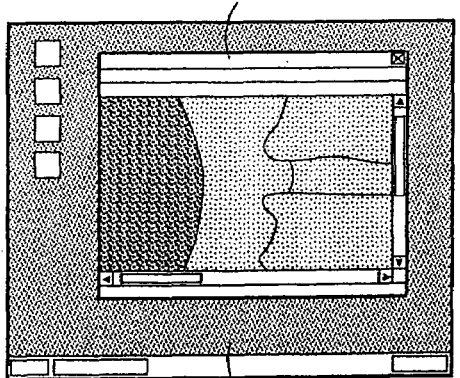

Application window
A

D
Desktop screen

Fig. 4   monochromatic/color conversion table 1'

|  | monochromatic gradation level | color RGB value |
|---|---|---|
| x  r  g  b | x | r  g  b |

```
lut[0]  = 0, 0, 0                    lut[513] = 127, 127, 134
lut[1]  = 0, 0, 2                    lut[514] = 128, 128, 128
lut[2]  = 0, 0, 4                    lut[515] = 128, 128, 130
lut[3]  = 0, 0, 6
lut[4]  = 1, 1, 1
lut[5]  = 1, 1, 3                              ...
lut[6]  = 1, 1, 5
lut[7]  = 1, 1, 7                    lut[768] = 191, 191, 195
lut[8]  = 2, 2, 2                    lut[769] = 191, 191, 197
lut[9]  = 2, 2, 4                    lut[770] = 191, 191, 198
lut[10] = 2, 2, 6                    lut[771] = 192, 192, 192
lut[11] = 2, 2, 8                    lut[772] = 192, 192, 194
lut[12] = 3, 3, 3                              ...
lut[13] = 3, 3, 5
lut[14] = 3, 3, 7                    lut[999]  = 249, 249, 249
lut[15] = 3, 3, 9                    lut[1000] = 249, 249, 251
lut[16] = 4, 4, 4                    lut[1001] = 249, 249, 253
lut[17] = 4, 4, 6                    lut[1002] = 249, 249, 255
lut[18] = 4, 4, 8                    lut[1003] = 251, 251, 243
lut[19] = 4, 4, 10                   lut[1004] = 251, 251, 245
lut[20] = 5, 5, 5                    lut[1005] = 251, 251, 247
lut[21] = 5, 5, 7                    lut[1006] = 251, 251, 249
lut[22] = 5, 5, 9                    lut[1007] = 252, 252, 244
lut[23] = 5, 5, 11                   lut[1008] = 252, 252, 246
lut[24] = 6, 6, 6                    lut[1009] = 252, 252, 248
                                     lut[1010] = 252, 252, 250
                                     lut[1011] = 253, 253, 245
                                     lut[1012] = 253, 253, 247
          ...                        lut[1013] = 253, 253, 249
                                     lut[1014] = 253, 253, 251
lut[254] = 63, 63, 67                lut[1015] = 254, 254, 246
lut[255] = 63, 63, 69                lut[1016] = 254, 254, 248
lut[256] = 63, 63, 70                lut[1017] = 254, 254, 250
lut[257] = 64, 64, 64                lut[1018] = 254, 254, 252
lut[258] = 64, 64, 66                lut[1019] = 255, 255, 247
                                     lut[1020] = 255, 255, 249
          ...                        lut[1021] = 255, 255, 251
                                     lut[1022] = 255, 255, 253
lut[511] = 127, 127, 131             lut[1023] = 255, 255, 255
lut[512] = 127, 127, 133
```

Fig. 5  monochromatic/color combination table 2

|  | x r g b | monochromatic gradation level x | color RGB value r g b |
|---|---|---|---|
| | lut[0] = 0, 0, 0 | lut[512] = 128, 128, 128 | |
| | lut[1] = 0, 0, 2 | lut[513] = 128, 128, 130 | |
| | lut[2] = 0, 0, 4 | ... | |
| | lut[3] = 0, 0, 6 | | |
| | lut[4] = 1, 1, 1 | | |
| | lut[5] = 1, 1, 3 | lut[766] = 191, 191, 195 | |
| | lut[6] = 1, 1, 5 | lut[767] = 191, 191, 197 | |
| | lut[7] = 1, 1, 7 | lut[768] = 192, 192, 192 | |
| | lut[8] = 2, 2, 2 | lut[769] = 192, 192, 194 | |
| | lut[9] = 2, 2, 4 | ... | |
| | lut[10] = 2, 2, 6 | | |
| | lut[11] = 2, 2, 8 | lut[996] = 249, 249, 249 | |
| | lut[12] = 3, 3, 3 | lut[997] = 249, 249, 251 | |
| | lut[13] = 3, 3, 5 | lut[998] = 249, 249, 253 | |
| | lut[14] = 3, 3, 7 | lut[999] = 249, 249, 255 | |
| | lut[15] = 3, 3, 9 | lut[1000] = 251, 251, 243 | |
| | lut[16] = 4, 4, 4 | lut[1001] = 251, 251, 245 | |
| | lut[17] = 4, 4, 6 | lut[1002] = 251, 251, 247 | |
| | lut[18] = 4, 4, 8 | lut[1003] = 251, 251, 249 | |
| | lut[19] = 4, 4, 10 | lut[1004] = 252, 252, 244 | |
| | lut[20] = 5, 5, 5 | lut[1005] = 252, 252, 246 | |
| | lut[21] = 5, 5, 7 | lut[1006] = 252, 252, 248 | |
| | lut[22] = 5, 5, 9 | lut[1007] = 252, 252, 250 | |
| | lut[23] = 5, 5, 11 | lut[1008] = 253, 253, 245 | |
| | lut[24] = 6, 6, 6 | lut[1009] = 253, 253, 247 | |
| | | lut[1010] = 253, 253, 249 | |
| | | lut[1011] = 253, 253, 251 | |
| | ... | lut[1012] = 254, 254, 246 | |
| | | lut[1013] = 254, 254, 248 | |
| | lut[254] = 63, 63, 67 | lut[1014] = 254, 254, 250 | |
| | lut[255] = 63, 63, 69 | lut[1015] = 254, 254, 252 | |
| | lut[256] = 64, 64, 64 | lut[1016] = 255, 255, 247 | |
| | lut[257] = 64, 64, 66 | lut[1017] = 255, 255, 249 | |
| | | lut[1018] = 255, 255, 251 | |
| | | lut[1019] = 255, 255, 253 | |
| | ... | lut[1020] = 255, 255, 255 | |
| | lut[510] = 127, 127, 131 | | |
| | lut[511] = 127, 127, 133 | | |

Fig. 6 monochromatic/color conversion table 1″

|  |  |  |  | monochromatic gradation level | color RGB value |  |  |
|---|---|---|---|---|---|---|---|
| x | r | g | b | x | r | g | b | lut[0] = 0, 0, 0
lut[1] = 0, 0, 1
lut[2] = 0, 0, 2
lut[3] = 0, 0, 3
lut[4] = 0, 0, 4
...

lut[254] = 32, 32, 30
lut[255] = 32, 32, 31
lut[256] = 33, 32, 29
lut[257] = 32, 32, 32
lut[258] = 32, 32, 33
...

lut[511] = 63, 63, 69
lut[512] = 64, 64, 63
lut[513] = 65, 64, 61
lut[514] = 64, 64, 64
lut[515] = 64, 64, 65
...

lut[768] = 96, 96, 94
lut[769] = 96, 96, 95
lut[770] = 97, 96, 93
lut[771] = 96, 96, 96
lut[772] = 96, 96, 97
...

lut[1025] = 128, 128, 126
lut[1026] = 128, 128, 127
lut[1027] = 129, 128, 125
lut[1028] = 128, 128, 128
lut[1029] = 128, 128, 129

...

lut[1282] = 160, 160, 158
lut[1283] = 160, 160, 159
lut[1284] = 161, 160, 157
lut[1285] = 160, 160, 160
lut[1286] = 160, 160, 161
...

lut[1539] = 192, 192, 190
lut[1540] = 192, 192, 191
lut[1541] = 193, 192, 189
lut[1542] = 192, 192, 192
lut[1543] = 192, 192, 193
...

lut[1796] = 223, 223, 229
lut[1797] = 223, 223, 230
lut[1798] = 224, 223, 228
lut[1799] = 224, 224, 224
lut[1800] = 224, 224, 225
...

lut[2041] = 255, 255, 249
lut[2042] = 255, 255, 250
lut[2043] = 255, 255, 251
lut[2044] = 255, 255, 252
lut[2045] = 255, 255, 253
lut[2046] = 255, 255, 254
lut[2047] = 255, 255, 255

Fig. 7    monochromatic/color combination table

┌─ 3

|  | | | | monochromatic gradation level | color RGB value | | |
|---|---|---|---|---|---|---|---|
| x | r | g | b | x | r | g | b | lut[0] = 0, 0, 0
lut[1] = 0, 0, 1
lut[2] = 0, 0, 2
lut[3] = 0, 0, 3
lut[4] = 0, 0, 4

...

lut[254] = 32, 32, 30
lut[255] = 32, 32, 31
lut[256] = 32, 32, 32
lut[257] = 32, 32, 33

...

lut[510] = 63, 63, 69
lut[511] = 64, 64, 63
lut[512] = 64, 64, 64
lut[513] = 64, 64, 65

...

lut[766] = 96, 96, 94
lut[767] = 96, 96, 95
lut[768] = 96, 96, 96
lut[769] = 96, 96, 97

...

lut[1022] = 128, 128, 126
lut[1023] = 128, 128, 127
lut[1024] = 128, 128, 128
lut[1025] = 128, 128, 129 lut[1278] = 160, 160, 158
lut[1279] = 160, 160, 159
lut[1280] = 160, 160, 160
lut[1281] = 160, 160, 161

...

lut[1534] = 192, 192, 190
lut[1535] = 192, 192, 191
lut[1536] = 192, 192, 192
lut[1537] = 192, 192, 193

...

lut[1790] = 223, 223, 229
lut[1791] = 223, 223, 230
lut[1792] = 224, 224, 224
lut[1793] = 224, 224, 225

...

lut[2034] = 255, 255, 249
lut[2035] = 255, 255, 250
lut[2036] = 255, 255, 251
lut[2037] = 255, 255, 252
lut[2038] = 255, 255, 253
lut[2039] = 255, 255, 254
lut[2040] = 255, 255, 255

MULTI-GRADATION MONOCHROMATIC IMAGE DISPLAY METHOD, MULTI-GRADATION MONOCHROMATIC IMAGE DISPLAY DEVICE, COMPUTER, MONOCHROMATIC DISPLAY DEVICE, RE-CONVERSION ADAPTER, AND VIDEO CARD

"This application is a continuation of PCT/JP03/09897 filed on Aug. 4, 2003".

FILED OF THE INVENTION

The present invention relates to a multi-gradation monochromatic image display method, a multi-gradation monochromatic image display device, a computer, a monochromatic display device, a re-conversion adapter, and a video card. More particularly, the present invention relates to a multi-gradation monochromatic image display method, a multi-gradation monochromatic image display device, a computer, a monochromatic display device, a re-conversion adapter, and a video card for displaying a monochromatic image at multiple gradation levels which exceed the limit of gradation of an OS (operating system) without drastically modifying the hardware or software.

BACKGROUND OF THE INVENTION

In Window XP, one of conventional OS softwares, each of the primary colors R, G, and B in a color image can separately be expressed in 8-bit gradation of the luminance. Hence, the color image is displayed at 3×8=24 bits. However, any monochromatic image can be limited to the 8-bit gradation because the luminance of each of the colors R, G, and B is uniform.

Also, as monochromatic images for medical use are preferably displayed in 10-bit or 12-bit gradation for improving the diagnostic accuracy, there are proposed application softwares for processing such multi-gradation monochromatic images.

It is known that, when a monochromatic image of 10-bit gradation is displayed on a display unit with the use of an OS limiting the monochromatic gradation to 8-bit grade, its upper 8 bits only are used effective while its other lower bits are discarded.

This however impairs the (less weighted) gradation of lower bits pertinent to the multi-gradation monochromatic image.

On the other hand, any common monochromatic display device is designed capable of displaying a monochromatic image of 10-bit gradation.

As described, the monochromatic image of 10-bit gradation is unfavorably displayed at 8-bit gradation on such a common 10-bit gradation compatible monochromatic display device because its upper 8 bits are only used effective and the other lower bits are discarded due to the limitation of the OS.

Alternatively, an image of 8-bit gradation may be expanded to 10-bit gradation by a type of monochromatic display device. This expansion is intended for ease of the gamma correction while the gradation of an 8-bit monochromatic image is not increased to 10 bits.

The monochromatic image of 10-bit gradation may successfully be displayed on a 10-bit gradation compatible monochromatic display device when it has been transferred using a dedicated software or hardware but not a conventional OS or video card.

Such a dedicated software or hardware will however increase the overall cost.

It is hence an object of the present invention to provide a multi-gradation monochromatic image display method, a multi-gradation monochromatic image display device, a computer, a monochromatic display device, a re-conversion adapter, and a video card for displaying a monochromatic image at multiple gradation levels which exceed the limit of gradation of an OS (operating system) without drastically modifying the hardware or software.

An attempt for displaying a monochromatic image at multiple gradation levels (for example, 1024 levels) with the use of a color image display device having a less number of gray levels (for example, 256 levels in each color of the R, G, and B primary colors) has been proposed as disclosed in Japanese Patent Laid-open Publication No. 2001-34232.

The present invention has been developed for eliminating the drawback that the display of a monochromatic image at multiple gradation levels (for example, 1024 levels) on a monochromatic image display device capable of reproduction of a monochromatic image at multiple gradation levels (for example, 1024 levels) is disabled by the limitation of an operating system of the computer and is substantially different in the object, the arrangement, and the effect from the method disclosed in the above publication No. 2001-34232.

SUMMARY OF THE INVENTION

As a first aspect of the present invention, a multi-gradation monochromatic image displaying method is provided which is characterized by: converting a monochromatic image, of which the number of gradation levels is greater than that of a monochromatic image viably handled by an operating system (13), into a color image; feeding the color image to the operating system (13) of which the number of colors in a color image is greater than the number of gradation levels in a monochromatic image; and converting again the color image received from the operating system (13) into a monochromatic image, of which the number of gradation levels is greater than that of the monochromatic image viably handled by the operating system (13), for display.

In the multi-gradation monochromatic image displaying method of the first aspect, the monochromatic image of which the number of gradation levels (for example, 1024) is greater than that (for example, 256) of a monochromatic image viably handled by the OS (13) is converted into a color image which is then received by the OS (13). As the color image to be handled by the OS (13) is embraced by the number of available colors (for example, 16,777,216) and can thus be released out directly. The color image released from the OS (13) is then converted into a monochromatic image of which the number of gradation levels (for example, 1021 or 1024) is greater than that (for example, 256) of a monochromatic image viably handled by the OS (13) before displayed. Accordingly, the monochromatic image can be displayed at multiple gradation levels which exceed the gradation limit of any conventional operating system without drastically modifying the hardware or software.

As a second aspect of the present invention, the multi-gradation monochromatic image displaying method, described above, may be modified in which when the gradation level [x] of the monochromatic image ranges from 0 to 1023 and the RGB values of the color image are r=0-255, g=0-255, and b=0-255, the relationship is given as $x = r \times 5/4 + g \times 9/4 + b \times 2/4$ at $[x]$ ranging from 0 to 255, $r=63, g=63,$ and $b=70$ at $[x]=256,$ $x = r \times 5/4 + g \times 9/4 + b \times 2/4 + 1$ at [x] ranging from 257 to 512, $r=127, g=127,$ and $b=134$ at [x]=513, $x = r \times 5/4 + g \times 9/4 + b \times 2/4 + 2$ at [x] ranging from 514 to 769, $r=191, g=191,$ and $b=198$ at [x]=770, and $x = r \times 5/4 + g \times 9/4 + b \times 2/4 + 3$ at [x] ranging from 771 to 1023.

The multi-gradation monochromatic image displaying method of the second aspect allows the gradation level [x] in a monochromatic image and the RGB values (r, g, b) in a color image to be determined by the NTSC weighted averaging technique for converting a color signal into a monochromatic signal, whereby a color image provided via the OS from a common application software or produced directly by the OS can be displayed as a favorable (natural) multi-gradation monochromatic image (at 1024 gradation levels) on an available monochromatic display device.

As a third aspect of the present invention, the multi-gradation monochromatic image displaying method, described above, may be modified in which when the gradation level [x] of the monochromatic image ranges from 0 to 2047 and the RGB values of the color image are r=0-255, g=0-255, and b=0-255, the relationship is given as $x = r \times 5/2 + g \times 9/2 + b \times 2/2$ at [x] ranging from 0 to 255, $r=33, g=32,$ and $b=29$ at [x]=256, $x = r \times 5/2 + g \times 9/2 + b \times 2/2 + 1$ at [x] ranging from 257 to 512, $r=65, g=64,$ and $b=61$ at [x]=513, $x = r \times 5/2 + g \times 9/2 + b \times 2/2 + 2$ at [x] ranging from 514 to 769, $r=97, g=96,$ and $b=93$ at [x]=770, $x = r \times 5/2 + g \times 9/2 + b \times 2/2 + 3$ at [x] ranging from 771 to 1026, $r=129, g=128,$ and $b=125$ at [x]=1027, $x = r \times 5/2 + g \times 9/2 + b \times 2/2 + 4$ at [x] ranging from 1028 to 1283, $r=161, g=160,$ and $b=157$ at [x]=1284, $x = r \times 5/2 + g \times 9/2 + b \times 2/2 + 5$ at [x] ranging from 1285 to 1540, $r=193, g=192,$ and $b=189$ at [x]=1541, $x = r \times 5/2 + g \times 9/2 + b \times 2/2 + 6$ at [x] ranging from 1542 to 1797, $r=224, g=223,$ and $b=228$ at [x]=1798, and $x = r \times 5/2 + g \times 9/2 + b \times 2/2 + 7$ at [x] ranging from 1799 to 2047.

The multi-gradation monochromatic image displaying method of the third aspect allows the gradation level [x] in a monochromatic image and the RGB values (r, g, b) in a color image to be determined by the NTSC weighted averaging technique for converting a color signal into a monochromatic signal, whereby a color image provided via the OS from a common application software or produced directly by the OS can be displayed as a favorable multi-gradation monochromatic image (at 2048 gradation levels) on an available monochromatic display device.

As a fourth aspect of the present invention, a multi-gradation monochromatic image display device (100A) is provided having a computer (10A) and a monochromatic display device (20A). In particular, the computer (10A) comprises an operating system (13) where the number of colors of a color image is greater than the number of gradation levels of a monochromatic image, a monochromatic image outputting means (11) for outputting a monochromatic image of which the number of gradation levels is greater than that of a monochromatic image viably handled by the operating system (13), a monochromatic/color converting means (12) for converting the multi-gradation monochromatic image released from the monochromatic image outputting means (11) into a color image which is then received by the operating system (13), and a video card (14) for releasing the digital data of the color image released from the operating system (13). Also, the monochromatic display device (20A) comprises a color/monochromatic converting means (22) for converting again the color image received from the video card (14) into a monochromatic image of which the number of gradation levels is greater than that of the monochromatic image viably handled by the operating system (13) and a multi-gradation monochromatic image displaying means (23) for displaying the monochromatic image at multiple gradation levels.

The multi-gradation monochromatic image display device (100A) of the fourth aspect allows the multi-gradation monochromatic image displaying method of the first aspect to be favorably conducted and preferably with the use of a common video card.

As a fifth aspect of the present invention, a multi-gradation monochromatic image display device (100B) is provided having a computer (10A), a re-conversion adapter (40), and a monochromatic display device (20). In particular, the computer (10A) comprises an operating system (13) where the number of colors of a color image is greater than the number of gradation levels of a monochromatic image, a monochromatic image outputting means (11) for outputting a monochromatic image of which the number of gradation levels is greater than that of a monochromatic image viably handled by the operating system (13), a monochromatic/color converting means (12) for converting the multi-gradation monochromatic image released from the monochromatic image outputting means (11) into a color image which is then received by the operating system (13), and a video card (14) for releasing the digital data of the color image released from the operating system (13). Also, the re-conversion adapter (40) comprises a color/monochromatic converting means (42) for converting again the color image received from the video card (14) into a monochromatic image of which the number of gradation levels is greater than that of the monochromatic image viably handled by the operating system (13). The monochromatic display device (20) comprises a multi-gradation monochromatic image displaying means (23) for displaying the monochromatic image at multiple gradation levels received from the re-conversion adapter (40).

The multi-gradation monochromatic image display device (100B) of the fifth aspect allows the multi-gradation monochromatic image displaying method of the first aspect to be favorably conducted and preferably with the use of a common video card and a common monochromatic display device.

As a sixth aspect of the present invention, a multi-gradation monochromatic image display device (100C) is provided having a computer (10C) and a monochromatic display device (20). In particular, the computer (10C) comprises an operating system (13) where the number of colors of a color image is greater than the number of gradation levels of a monochromatic image, a monochromatic image outputting means (11) for outputting a monochromatic image of which the number of gradation levels is greater than that of a monochromatic image viably handled by the operating system (13), a monochromatic/color converting means (12) for converting the multi-gradation monochromatic image released from the monochromatic image outputting means (11) into a color image which is then received by the operating system (13), and a video card (14C) provided with a color/monochromatic converting means (16), which converts again the color image received from the operating system (13) into a monochromatic image of which the number of gradation levels is greater than that of the monochromatic image viably handled by the operating system (13), for releasing the digital data of the monochromatic image at multiple gradation levels reconverted from the color image. Also, the monochromatic display device (20) comprises a multi-gradation monochromatic image displaying means (23) for displaying the monochromatic image at multiple gradation levels released from the video card (14C).

The multi-gradation monochromatic image display device (100C) of the sixth aspect allows the multi-gradation monochromatic image displaying method of the first aspect to be favorably conducted and preferably with the use of a common monochromatic display device.

As a seventh aspect of the present invention, the multi-gradation monochromatic image display device, described above, may be modified in which when the gradation level [x] of the monochromatic image ranges from 0 to 1023 and the RGB values of the color image are r=0-255, g=0-255, and b=0-255, the relationship is given as $x=r\times5/4+g\times9/4+b\times2/4$ at $[x]$ ranging from 0 to 255, $r=63, g=63,$ and $b=70$ at $[x]=256,$ $x=r\times5/4+g\times9/4+b\times2/4+1$ at $[x]$ ranging from 257 to 512, $r=127, g=127,$ and $b=134$ at $[x]=513,$ $x=r\times5/4+g\times9/4+b\times2/4+2$ at $[x]$ ranging from 514 to 769, $r=191, g=191,$ and $b=198$ at $[x]=770,$ and $x=r\times5/4+g\times9/4+b\times2/4+3$ at $[x]$ ranging from 771 to 1023.

The multi-gradation monochromatic image display device of the seventh aspect allows the multi-gradation monochromatic image displaying method of the second aspect to be favorably conducted.

As an eighth aspect of the present invention, the multi-gradation monochromatic image display device, described above, may be modified in which when the gradation level [x] of the monochromatic image ranges from 0 to 2047 and the RGB values of the color image are r=0-255, g=0-255, and b=0-255, the relationship is given as $x=r\times5/2+g\times9/2+b\times2/2$ at $[x]$ ranging from 0 to 255, $r=33, g=32,$ and $b=29$ at $[x]=256,$ $x=r\times5/2+g\times9/2+b\times2/2+1$ at $[x]$ ranging from 257 to 512, $r=65, g=64,$ and $b=61$ at $[x]=513,$ $x=r\times5/2+g\times9/2+b\times2/2+2$ at $[x]$ ranging from 514 to 769, $r=97, g=96,$ and $b=93$ at $[x]=770,$ $x=r\times5/2+g\times9/2+b\times2/2+3$ at $[x]$ ranging from 771 to 1026, $r=129, g=128,$ and $b=125$ at $[x]=1027,$ $x=r\times5/2+g\times9/2+b\times2/2+4$ at $[x]$ ranging from 1028 to 1283, $r=161, g=160,$ and $b=157$ at $[x]=1284,$ $x=r\times5/2+g\times9/2+b\times2/2+5$ at $[x]$ ranging from 1285 to 1540, $r=193, g=192,$ and $b=189$ at $[x]=1541,$ $x=r\times5/2+g\times9/2+b\times2/2+6$ at $[x]$ ranging from 1542 to 1797, $r=224, g=223,$ and $b=228$ at $[x]=1798,$ and $x=r\times5/2+g\times9/2+b\times2/2+7$ at $[x]$ ranging from 1799 to 2047.

The multi-gradation monochromatic image display device of the eighth aspect allows the multi-gradation monochromatic image displaying method of the third aspect to be favorably conducted.

As a ninth aspect of the present invention, the multi-gradation monochromatic image display device, described above, may be modified in which the monochromatic/color converting means (12) is arranged for converting the gradation level [x] of a multi-gradation monochromatic image into a set of the RGB values (r, g, b) of a color image with the use of a table (1, 1', 1") or arithmetic formula.

The multi-gradation monochromatic image display device of the ninth aspect can operate a high-speed processing action using the table (1, 1', 1") while the arithmetic formula contributes to reduce the storage size. In addition, the monochromatic/color converting means (12) may be implemented by a software for ease of the arrangement or by a hardware for conducting the processing action at higher speeds.

As a tenth aspect of the present invention, the multi-gradation monochromatic image display device, described above, may be modified in which the monochromatic/color converting means (12) is contained in the monochromatic image outputting means (11).

Since the multi-gradation monochromatic image display device (100A, 100B, 100C) of the tenth aspect has the monochromatic/color converting means (12) contained in the monochromatic image outputting means (11), its overall arrangement can be simplified. Also, the monochromatic image outputting means (11) may be implemented by a software for ease of the arrangement or by a hardware for conducting the processing action at higher speeds.

As an eleventh aspect of the present invention, a computer (10C) is provided comprising: an operating system (13) where the number of colors of a color image is greater than the number of gradation levels of a monochromatic image; a monochromatic image outputting means (11) for outputting a monochromatic image of which the number of gradation levels is greater than that of a monochromatic image viably handled by the operating system (13); a monochromatic/color converting means (12) for converting the multi-gradation monochromatic image released from the monochromatic image outputting means (11) into a color image which is then received by the operating system (13); and a video card (14C) provided with a color/monochromatic converting means (16), which converts again the color image received from the operating system (13) into a monochromatic image of which the number of gradation levels is greater than that of the monochromatic image viably handled by the operating system (13), for releasing the digital data of the monochromatic image at multiple gradation levels re-converted from the color image.

The computer (10C) of the eleventh aspect is hence desirable for conducting the multi-gradation monochromatic image displaying method of the first aspect.

As a twelfth aspect of the present invention, the computer (10C) may be modified in which when the gradation level [x] of the monochromatic image ranges from 0 to 1023 and the RGB values of the color image are r=0-255, g=0-255, and b=0-255, the relationship is given as $x = r \times 5/4 + g \times 9/4 + b \times 2/4$ at [x] ranging from 0 to 255, $r=63$, $g=63$, and $b=70$ at [x]=256, $x = r \times 5/4 + g \times 9/4 + b \times 2/4 + 1$ at [x] ranging from 257 to 512, $r=127$, $g=127$, and $b=134$ at [x]=513, $x = r \times 5/4 + g \times 9/4 + b \times 2/4 + 2$ at [x] ranging from 514 to 769, $r=191$, $g=191$, and $b=198$ at [x]=770, and $x = r \times 5/4 + g \times 9/4 + b \times 2/4 + 3$ at [x] ranging from 771 to 1023.

The computer (10C) of the twelfth aspect is hence desirable for conducting the multi-gradation monochromatic image displaying method of the second aspect.

As a thirteenth aspect of the present invention, the computer (10C) may be modified in which when the gradation level [x] of the monochromatic image ranges from 0 to 2047 and the RGB values of the color image are r=0-255, g=0-255, and b=0-255, the relationship is given as $x = r \times 5/2 + g \times 9/2 + b \times 2/2$ at [x] ranging from 0 to 255, $r=33$, $g=32$, and $b=29$ at [x]=256, $x = r \times 5/2 + g \times 9/2 + b \times 2/2 + 1$ at [x] ranging from 257 to 512, $r=65$, $g=64$, and $b=61$ at [x]=513, $x = r \times 5/2 + g \times 9/2 + b \times 2/2 + 2$ at [x] ranging from 514 to 769, $r=97$, $g=96$, and $b=93$ at [x]=770, $x = r \times 5/2 + g \times 9/2 + b \times 2/2 + 3$ at [x] ranging from 771 to 1026, $r=129$, $g=128$, and $b=125$ at [x]=1027, $x = r \times 5/2 + g \times 9/2 + b \times 2/2 + 4$ at [x] ranging from 1028 to 1283, $r=161$, $g=160$, and $b=157$ at [x]=1284, $x = r \times 5/2 + g \times 9/2 + b \times 2/2 + 5$ at [x] ranging from 1285 to 1540, $r=193$, $g=192$, and $b=189$ at [x]=1541, $x = r \times 5/2 + g \times 9/2 + b \times 2/2 + 6$ at [x] ranging from 1542 to 1797, $r=224$, $g=223$, and $b=228$ at [x]=1798, and $x = r \times 5/2 + g \times 9/2 + b \times 2/2 + 7$ at [x] ranging from 1799 to 2047.

The computer (10C) of the thirteenth aspect is hence desirable for conducting the multi-gradation monochromatic image displaying method of the third aspect.

As a fourteenth aspect of the present invention, the computer (10C) may be modified in which the monochromatic/color converting means (12) is arranged for converting the gradation level [x] of a multi-gradation monochromatic image into a set of the RGB values (r, g, b) of a color image with the use of a table (1, 1', 1") or arithmetic formula.

The computer (10C) of the fourteenth aspect can operate a high-speed processing action using the table (1, 1', 1") while the arithmetic formula contributes to reduce the storage size. In addition, the monochromatic/color converting means (12) may be implemented by a software for ease of the arrangement or by a hardware for conducting the processing action at higher speeds.

As a fifteenth aspect of the present invention, the computer (10C) may be modified in which the monochromatic/color converting means (12) is contained in the monochromatic image outputting means (11).

Since the computer (10C) of the fifteenth aspect has the monochromatic/color converting means (12) contained in the monochromatic image outputting means (11), its arrangement can be simplified.

As a sixteenth aspect of the present invention, a monochromatic display device (20A) is provided comprising a color/monochromatic converting means (22) for converting a color image received into a multi-gradation monochromatic image and a multi-gradation monochromatic image displaying means (23) for displaying the multi-gradation monochromatic image converted from the color image. In particular, the color/monochromatic converting means (22) is arranged in that when the RGB values of the color image are r=0-255, g=0-255, and b=0-255, the gradation level [x] of the monochromatic image which ranges from 0 to 1023 is expressed by $[x] = r \times 5/4 + g \times 9/4 + b \times 2/4$ at $0 \leq r \times 5/4 + g \times 9/4 + b \times 2/4 \leq 255$, $[x]=256$ at $r=63$, $g=63$, and $b=70$, $[x] = r \times 5/4 + g \times 9/4 + b \times 2/4 + 1$ at $257 \leq r \times 5/4 + g \times 9/4 + b \times 2/4 + 1 \leq 512$, $[x]=513$ at $r=127$, $g=127$, and $b=134$, $[x] = r \times 5/4 + g \times 9/4 + b \times 2/4 + 2$ at $514 \leq r \times 5/4 + g \times 9/4 + b \times 2/4 + 2 \leq 769$, $[x]=770$ at $r=191$, $g=191$, and $b=198$, and $[x] = r \times 5/4 + g \times 9/4 + b \times 2/4 + 3$ at $771 \leq r \times 5/4 + g \times 9/4 + b \times 2/4 + 3 \leq 1023$.

The monochromatic display device (20A) of the sixteenth aspect is hence desirable for conducting the multi-gradation monochromatic image displaying method of the second aspect.

As a seventeenth aspect of the present invention, a monochromatic display device (20A) is provided comprising a color/monochromatic converting means (22) for converting a color image received into a multi-gradation monochromatic image and a multi-gradation monochromatic image displaying means (23) for displaying the multi-gradation monochromatic image converted from the color image. In particular, the color/monochromatic converting means (22) is arranged in that when the RGB values of the color image are r=0-255, g=0-255, and b=0-255, the gradation level [x] of the monochromatic image which ranges from 0 to 2047 is expressed by $$[x]=r\times 5/2+g\times 9/2+b\times 2/2 \text{ at } 0\leq r\times 5/2+g\times 9/2+b\times 2/2\leq 255,$$

$$[x]=256 \text{ at } r=33, g=32, \text{ and } b=29,$$

$$[x]=r\times 5/2+g\times 9/2+b\times 2/2+1 \text{ at } 257\leq r\times 5/2+g\times 9/2+b\times 2/2+1\leq 512,$$

$$[x]=513 \text{ at } r=65, g=64, \text{ and } b=61,$$

$$[x]=r\times 5/2+g\times 9/2+b\times 2/2+2 \text{ at } 514\leq r\times 5/2+g\times 9/2+b\times 2/2+2\leq 769,$$

$$[x]=770 \text{ at } r=97, g=96, \text{ and } b=93, \text{ and}$$

$$[x]=r\times 5/2+g\times 9/2+b\times 2/2+3 \text{ at } 771\leq r\times 5/2+g\times 9/2+b\times 2/2+3\leq 1026,$$

$$[x]=1027 \text{ at } r=129, g=128, \text{ and } b=125,$$

$$[x]=r\times 5/2+g\times 9/2+b\times 2/2+4 \text{ at } 1028\leq r\times 5/2+g\times 9/2+b\times 2/2+4\leq 1283,$$

$$[x]=1284 \text{ at } r=161, g=160, \text{ and } b=157,$$

$$[x]=r\times 5/2+g\times 9/2+b\times 2/2+5 \text{ at } 1285\leq r\times 5/2+g\times 9/2+b\times 2/2+5\leq 1540,$$

$$[x]=1541 \text{ at } r=193, g=192, \text{ and } b=189,$$

$$[x]=r\times 5/2+g\times 9/2+b\times 2/2+6 \text{ at } 1542\leq r\times 5/2+g\times 9/2+b\times 2/2+6\leq 1797,$$

$$[x]=1798 \text{ at } nr=224, g=223, \text{ and } b=228,$$

$$[x]=r\times 5/2+g\times 9/2+b\times 2/2+7 \text{ at } 1799\leq r\times 5/2+g\times 9/2+b\times 2/2+7\leq 2047.$$

The monochromatic display device (20A) of the seventeenth aspect is hence desirable for conducting the multi-gradation monochromatic image displaying method of the third aspect.

As an eighteenth aspect of the present invention, the monochromatic display device (20A) may be modified in which the color/monochromatic converting means (22) is arranged for converting the RGB values (r, g, b) of a color image into a gradation level [x] of a multi-gradation monochromatic image with the use of a table (1', 1") or arithmetic formula.

The monochromatic display device (20A) of the eighteenth aspect can operate a high-speed processing action using the table (1', 1") while the arithmetic formula contributes to reduce the storage size. In addition, the color/monochromatic converting means (22) may be implemented by a software for ease of the arrangement or by a hardware for conducting the processing action at higher speeds.

As a nineteenth aspect of the present invention, a re-conversion adapter (40) is provided comprising a color/monochromatic converting means (42) for converting a color image received into a multi-gradation monochromatic image. In particular, the color/monochromatic converting means (42) is arranged in that when the RGB values of the color image are r=0-255, g=0-255, and b=0-255, the gradation level [x] of the monochromatic image which ranges from 0 to 1023 is expressed by $$[x]=r\times 5/4+g\times 9/4+b\times 2/4 \text{ at } 0\leq r\times 5/4+g\times 9/4+b\times 2/4\leq 255,$$

$$[x]=256 \text{ at } r=63, g=63, \text{ and } b=70,$$

$$[x]=r\times 5/4+g\times 9/4+b\times 2/4+1 \text{ at } 257\leq r\times 5/4+g\times 9/4+b\times 2/4+1\leq 512,$$

$$[x]=513 \text{ at } r=127, g=127, \text{ and } b=134,$$

$$[x]=r\times 5/4+g\times 9/4+b\times 2/4+2 \text{ at } 514\leq r\times 5/4+g\times 9/4+b\times 2/4+2\leq 769,$$

$$[x]=770 \text{ at } r=191, g=191, \text{ and } b=198, \text{ and}$$

$$[x]=r\times 5/4+g\times 9/4+b\times 2/4+3 \text{ at } 771\leq r\times 5/4+g\times 9/4+b\times 2/4+3\leq 1023.$$

The re-conversion adapter (40) of the nineteenth aspect allows the multi-gradation monochromatic image displaying method of the second aspect to be favorably conducted and preferably with the use of a common video card and a common monochromatic display device.

As a twentieth aspect of the present invention, a re-conversion adapter (40) is provided comprising a color/monochromatic converting means (42) for converting a color image received into a multi-gradation monochromatic image. In particular, the color/monochromatic converting means (42) is arranged in that when the RGB values of the color image are r=0-255, g=0-255, and b=0-255, the gradation level [x] of the monochromatic image which ranges from 0 to 2047 is expressed by $$[x]=r\times 5/2+g\times 9/2+b\times 2/2 \text{ at } 0\leq r\times 5/2+g\times 9/2+b\times 2/2\leq 255,$$

$$[x]=256 \text{ at } r=33, g=32, \text{ and } b=29,$$

$$[x]=r\times 5/2+g\times 9/2+b\times 2/2+1 \text{ at } 257\leq r\times 5/2+g\times 9/2+b\times 2/2+1\leq 512,$$

$$[x]=513 \text{ at } r=65, g=64, \text{ and } b=61,$$

$$[x]=r\times 5/2+g\times 9/2+b\times 2/2+2 \text{ at } 514\leq r\times 5/2 +g\times 9/2+b\times 2/2+2\leq 769,$$

$$[x]=770 \text{ at } r=97, g=96, \text{ and } b=93, \text{ and}$$

$$[x]=r\times 5/2+g\times 9/2+b\times 2/2+3 \text{ at } 771\leq r\times 5/2+g\times 9/2+b\times 2/2+3\leq 1026,$$

$$[x]=1027 \text{ at } r=129, g=128, \text{ and } b=125,$$

$$[x]=r\times 5/2+g\times 9/2+b\times 2/2+4 \text{ at } 1028\leq r\times 5/2+g\times 9/2+b\times 2/2+4\leq 1283,$$

$$[x]=1284 \text{ at } r=161, g=160, \text{ and } b=157,$$

$$[x]=r\times 5/2+g\times 9/2+b\times 2/2+5 \text{ at } 1285\leq r\times 5/2+g\times 9/2+b\times 2/2+5\leq 1540,$$

$$[x]=1541 \text{ at } r=193, g=192, \text{ and } b=189,$$

$$[x]=r\times 5/2+g\times 9/2+b\times 2/2+6 \text{ at } 1542\leq r\times 5/2+g\times 9/2+b\times 2/2+6\leq 1797,$$

$$[x]=1798 \text{ at } r=224, g=223, \text{ and } b=228,$$

$$[x]=r\times 5/2+g\times 9/2+b\times 2/2+7 \text{ at } 1799\leq r\times 5/2+g\times 9/2+b\times 2/2+7\leq 2047.$$

The re-conversion adapter (40) of the twentieth aspect allows the multi-gradation monochromatic image displaying method of the third aspect to be favorably conducted and preferably with the use of a common video card and a common monochromatic display device.

As a twenty-first aspect of the present invention, the re-conversion adapter (40) may be modified in which the color/monochromatic converting means (42) is arranged for converting the RGB values (r, g, b) of a color image into a gradation level [x] of a multi-gradation monochromatic image with the use of a table (1', 1") or arithmetic formula.

The re-conversion adapter (40) of the twenty-first aspect can operate a high-speed processing action using the table (1', 1") while the arithmetic formula contributes to reduce the storage size. In addition, the color/monochromatic converting means (42) may be implemented by a software for ease of the arrangement or by a hardware for conducting the processing action at higher speeds.

As a twenty-second aspect of the present invention, a video card (14C) is provided which is characterized by a color/monochromatic converting means (16) arranged for converting again the color image received from an operating system (13) into a monochromatic image of which the number of gradation levels is greater than that of the monochromatic image viably handled by the operating system (13) so that the digital data of the monochromatic image at multiple gradation levels re-converted from the color image can be released.

The video card (14C) of the twenty-second aspect allows the multi-gradation monochromatic image displaying method of the first aspect to be favorably conducted and preferably with the use of a common monochromatic display device.

As a twenty-third aspect of the present invention, the video card (14C) may be modified in which the color/monochromatic converting means (16) is arranged in that when the RGB values of the color image are r=0-255, g=0-255, and b=0-255, the gradation level [x] of the monochromatic image which ranges from 0 to 1023 is expressed by $[x]=r\times5/4+g\times9/4+b\times2/4$ at $0\leq r\times5/4+g\times9/4+b\times2/4\leq255$, $[x]=256$ at $r=63, g=63,$ and $b=70$, $[x]=r\times5/4+g\times9/4+b\times2/4+1$ at $257\leq r\times5/4+g\times9/4+b\times2/4+1\leq512$, $[x]=513$ at $r=127, g=127,$ and $b=134$, $[x]=r\times5/4+g\times9/4+b\times2/4+2$ at $514\leq r\times5/4+g\times9/4+b\times2/4+2\leq769$, $[x]=770$ at $r=191, g=191,$ and $b=198$, and $[x]=r\times5/4+g\times9/4+b\times2/4+3$ at $771\leq r\times5/4+g\times9/4+b\times2/4+3\leq1023$.

The video card (14C) of the twenty-third aspect allows the multi-gradation monochromatic image displaying method of the second aspect to be favorably conducted and preferably with the use of a common monochromatic display device.

As a twenty-fourth aspect of the present invention, the video card (14C) may be modified in which the color/monochromatic converting means (16) is arranged in that when the RGB values of the color image are r=0-255, g=0-255, and b=0-255, the gradation level [x] of the monochromatic image which ranges from 0 to 2047 is expressed by $[x]=r\times5/2+g\times9/2+b\times2/2$ at $0\leq r\times5/2+g\times9/2+b\times2/2\leq255$, $[x]=256$ at $r=33, g=32,$ and $b=29$, $[x]=r\times5/2+g\times9/2+b\times2/2+1$ at $257\leq r\times5/2+g\times9/2+b\times2/2+1\leq512$, $[x]=513$ at $r=65, g=64,$ and $b=61$, $[x]=r\times5/2+g\times9/2+b\times2/2+2$ at $514\leq r\times5/2+g\times9/2+b\times2/2+2\leq769$, $[x]=770$ at $r=97, g=96,$ and $b=93$, and $[x]=r\times5/2+g\times9/2+b\times2/2+3$ at $771\leq r\times5/2+g\times9/2+b\times2/2+3\leq1026$, $[x]=1027$ at $r=129, g=128,$ and $b=125$, $[x]=r\times5/2+g\times9/2+b\times2/2+4$ at $1028\leq r\times5/2+g\times9/2+b\times2/2+4\leq1283$, $[x]=1284$ at $r=161, g=160,$ and $b=157$, $[x]=r\times5/2+g\times9/2+b\times2/2+5$ at $1285\leq r\times5/2+g\times9/2+b\times2/2+5\leq1540$, $[x]=1541$ at $r=193, g=192,$ and $b=189$, $[x]=r\times5/2+g\times9/2+b\times2/2+6$ at $1542\leq r\times5/2+g\times9/2+b\times2/2+6\leq1797$, $[x]=1798$ at $r=224, g=223,$ and $b=228$, $[x]=r\times5/2+g\times9/2+b\times2/2+7$ at $1799\leq r\times5/2+g\times9/2+b\times2/2+7\leq2047$.

The video card (14C) of the twenty-fourth aspect allows the multi-gradation monochromatic image displaying method of the third aspect to be favorably conducted and preferably with the use of a common monochromatic display device.

As a twenty-fifth aspect of the present invention, the video card (14C) may be modified in which the color/monochromatic converting means (16) is arranged for converting the RGB values (r, g, b) of a color image into a gradation level [x] of a multi-gradation monochromatic image with the use of a table (1, 1', 1") or arithmetic formula.

The video card (14C) of the twenty-fifth aspect can operate a high-speed processing action using the table (1, 1', 1") while the arithmetic formula contributes to reduce the storage size. In addition, the color/monochromatic converting means (16) may be implemented by a software for ease of the arrangement or by a hardware for conducting the processing action at higher speeds.

BRIEF DESCRIPTION OF THE DRAWINGS

FIG. 2 is an exemplary view of a monochromatic/color conversion table (1) according to the first embodiment;

FIG. 3 is an exemplary view of the desktop screen where an application window is locally displayed;

FIG. 4 is an exemplary view of a monochromatic/color conversion table (1') according to a second embodiment of the present invention;

FIG. 5 is an exemplary view of a monochromatic/color combination table (2) prepared for constructing the monochromatic/color conversion table (1') of the second embodiment;

FIG. 6 is an exemplary view of a monochromatic/color conversion table (1") according to a third embodiment of the present invention;

FIG. 7 is an exemplary view of a monochromatic/color combination table (3) prepared for constructing the monochromatic/color conversion table (1") of the third embodiment;

BEST MODES FOR EMBODYING THE INVENTION

Figure 1:
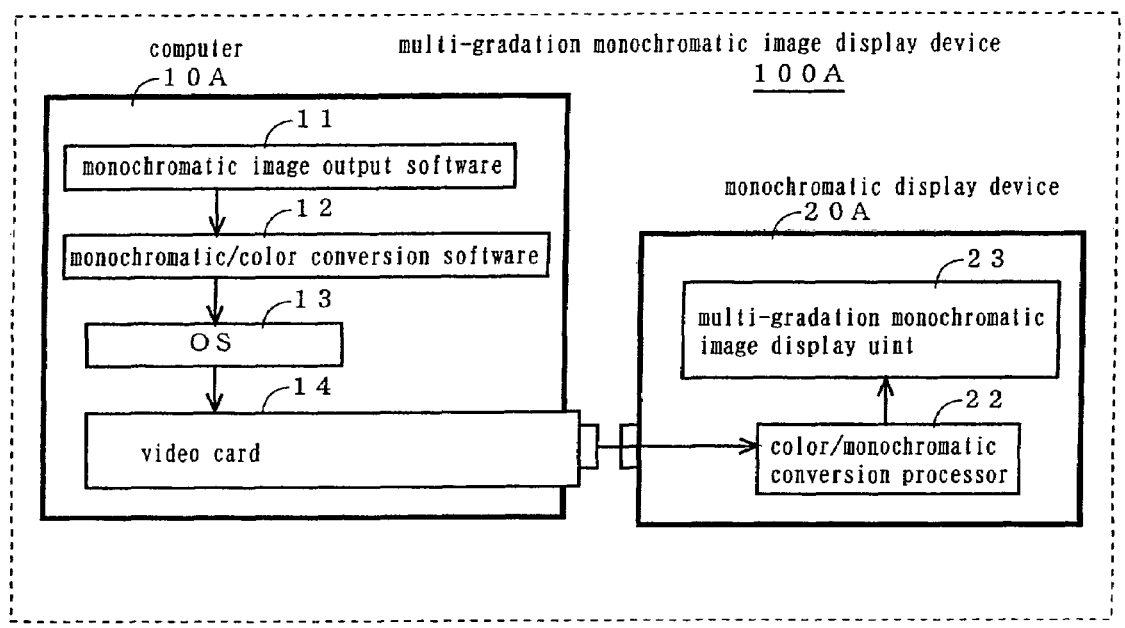
FIG. 1 is a structural block diagram of the multi-gradation monochromatic image display device (100A) showing a first embodiment of the present invention.

The present invention will be described in more detail in conjunctions with embodiments shown in the drawings. It is however understood that the present invention is not limited to the embodiments.

First Embodiment

As shown in FIG. 1, a multi-gradation monochromatic image display device 100A comprises a computer 10A and a monochromatic display device 20A.

The computer 10A may be a personal computer including an operating system 13 of which the number of colors of a color image is greater than the number of gradation levels of a monochromatic image, a monochromatic image output software 11 for outputting the gradation level (x) of a monochromatic image of which the number of gradation levels is greater than that of a monochromatic image viably handled by the operating system 13, a monochromatic/color conversion software 12 for converting the gradation level (x) of a multi-gradation monochromatic image output by the monochromatic image output software 11 into a set of RGB values (r, g, and b) of a color image, and a video card 14 for outputting the digital data of the color image received from the operating system 13.

For example, when the operating system 13 is Windows XP, the number of colors in its color image is 16,777,216 (3×8 bits) and the number of gradation levels in its monochromatic image is 256 (8 bits).

The monochromatic image output software 11 is arranged to process a monochromatic image of 10-bit gradation.

The monochromatic/color conversion software 12 is equipped with a monochromatic/color conversion table 1 such as shown in FIG. 2 for converting the gradation level (x) of 10-bit gradation, ranging from 0 to 1023, into a set of RGB values (r, g, and b) ranging from (0, 0, 0) to (255, 255, 255) at 3×8 bits. However, each of 1020 to 1023 of the gradation level (x) is converted into (r, g, b)=(255, 255, 255) of the RGB values. Accordingly, the number of gradation levels in a monochromatic image is actually 1021.

The video card 14 is a common type video card.

The monochromatic display device 20A comprises a color/monochromatic conversion processor 22 for converting a color image of input into a multi-gradation monochromatic image (for example, at 10-bit gradation) and a multi-gradation monochromatic image display 23 for displaying the multi-gradation monochromatic image (at 10-bit gradation).

The color/monochromatic conversion processor 22 is arranged for converting the RGB values (r, g, b) ranging from (0, 0, 0) to (255, 255, 255) at 3×8 bits into the gradation level [x] of the 10-bit gradation, ranging from 0 to 1020, with the use of, e.g., a re-conversion table which is an inverse of the monochromatic/color conversion table 1 shown in FIG. 2. A set of the RGB values (r, g, b)=(255, 255, 255) is converted into a gradation level [x] of 1020. The number of gradation levels in a monochromatic image to be displayed will thus be 1021 as described before.

The multi-gradation monochromatic image display device 100A of the first embodiment is capable of displaying a monochromatic image at multiple gradation levels (for example, 1021 levels) which exceed the limit of gradation of the OS 13 (for example, 256 levels) without drastically modifying the hardware or software. And the common type video card 14 can be employed.

It is now assumed as shown in FIG. 3 that the OS 13 is Windows XP and an Application window A exhibited locally on a Desktop screen D for displaying an image produced by the monochromatic image output software 11. A color image, that is a monochromatic/color converted color image in the Application window A and a color image in the Desktop screen surrounding the Application window A, is transferred from the computer 10A to the monochromatic image display device 20A. As a result, the monochromatic image of multiple gradations output by the monochromatic image output software 11 is shown in the Application window A while the Desktop screen D provided by the OS 13 is displayed as color/monochromatic converted monochromatic image surrounding the Application window A.

The monochromatic/color conversion table 1 shown in FIG. 2 may be produced by running a specific program shown below:

```
for (UINT r=0;r < M;++r) {
    for (UINT g=0;g < M;++g) {
        for (UINT b=0;b < M;++b) {
            UINT x= (r*R_PARAM + g*G_PARAM + b*B_PARAM)
*K;
            lut[x] = RGB (r, g, b);
        }
    }
}
```

The program calculates the gradation level [x] which corresponds to the RGB values (r, g, b) of a set ranging from (0, 0, 0) to (M-1, M-1, M-1). When the gradation levels [x] are equal at different sets of the RGB values (r, g, b), the last calculated set among the different sets of the RGB values (r, g, b) is selected.

Assuming that the monochromatic image viably handled by the OS 13 is at m-bit gradation and the multi-gradation monochromatic image is at k-bit gradation, M is expressed by $2^m$ and K is expressed by $2^{(k-m)}$.

The parameters R_PARAM, G_PARAM, and B_PARAM are preferably determined by the NTSC weighted averaging method thus being R_PARAM=0.298911, G_PARAM=0.586611, and B_PARAM=0.114478. This is because a set of the RGB values (r, g, b) is converted into a gradation level [x] of the monochromatic gradation by the color/monochromatic conversion processor 22 conducting the NTSC weighted averaging method for displaying the color image, provided through the OS 13 from a known application software or determined by the OS 13, as a favorable monochromatic image on the monochromatic display device 20A. Alternatively, the color image received from a common computer is displayed as a favorable monochromatic image on the monochromatic display device 20A connected to the computer.

The monochromatic/color conversion table 1 shown in FIG. 2 is determined with m=8 and k=10 and particularly adapted in which each of R_PARAM, G_PARAM, and B_PARAM is assigned with four bits and thus R_PARAM=5/16, G_PARAM=9/16, and B_PARAM=2/16 are established for ease of calculation. However, the gradation levels [x] ranging from 1021 to 1023 are expressed by (255, 255, 255) of the GRB values (r, g, b).

Second Embodiment

A second embodiment of the present invention is substantially identical to the first embodiment, except that the action of the monochromatic/color conversion software 12 and the color/monochromatic conversion processor 22 is modified.

The monochromatic/color conversion software 12 is provided with such a monochromatic/color conversion table 1' as shown in FIG. 4 for converting the gradation level [x] of a monochromatic image ranging from 0 to 1023 into a set of the RGB values (r, g, b) at 3×8 bits ranging from (0, 0, 0) to (255, 255, 255).

As apparent from FIG. 4, the gradation levels [x] from 0 to 1023 are converted into different sets of the RGB values (r, g, b). Accordingly, the number of gradation levels in the monochromatic image will thus be 1024.

The color/monochromatic conversion processor 22 is provided with a re-conversion table, which is an inverse of the monochromatic/color conversion table 1' shown in FIG. 4, for converting the RGB values (r, g, b) of 3×8 bits ranging from (0, 0, 0) to (255, 255, 255) into a gradation level [x] of the monochromatic image of 10-bit gradation ranging from 0 to 1023. Accordingly, the number of gradation levels in the monochromatic image displayed will thus be 1024.

A multi-gradation monochromatic image display device 100A of the second embodiment is hence capable of displaying a monochromatic image at multiple gradations (for example, 1024 levels) which exceed the gradation limit (for example, 256 levels) of the OS 13 without drastically modifying the hardware or software. And the common type video card 14 can be employed.

The monochromatic/color conversion table 1' shown in FIG. 4 will be constructed by the following procedure.

Steps 1: The RGB values (r, g, b) corresponding to the gradation level [x] ranging from 0 to 1020 is first determined to satisfy the following equation. It should be noted that the values r, g, and b are selected so that no decimal fractions appear at the right side of the equation.

$$x=(r*5/16+g*9/16+b*2/16)*4$$

A monochromatic/color combination table 2 is shown in FIG. 5 where groups of the RGB values (r, g, b) are listed corresponding to the gradation level [x] ranging from 0 to 1020.

Step 2: A group of the RGB values (r, g, b) corresponding to the gradation level [x] ranging from 768 to 1020 are assigned to 771 to 1023 of the gradation level respectively.

Step 3: Another group of the RGB values (r, g, b) corresponding to the gradation level [x] ranging from 512 to 767 are assigned to 514 to 769 of the gradation level respectively.

Step 4: A further group of the RGB values (r, g, b) corresponding to the gradation level [x] ranging from 256 to 511 are assigned to 257 to 512 of the gradation level respectively.

Step 5: A still further group of the RGB values (r, g, b) corresponding to the gradation level [x] ranging from 0 to 255 are assigned to 0 to 255 of the gradation level respectively.

Step 6: The gradation level [x] of 256 is assigned with a set of the RGB values of, e.g., (63, 63, 70) which is intermediate between 255 and 256 of the gradation level [x] as determined by the equation shown at Step 1.

Step 7: The gradation level [x] of 513 is assigned with a set of the RGB values of, e.g., (127, 127, 134) which is intermediate between 511 and 512 of the gradation level [x] as determined by the equation shown at Step 1.

Step 8: The gradation level [x] of 770 is assigned with a set of the RGB values of, e.g., (191, 191, 198) which is intermediate between 767 and 768 of the gradation level [x] as determined by the equation shown at Step 1.

By conducting those steps, the monochromatic/color conversion table 1' shown in FIG. 4 is constructed. Since the color/monochromatic conversion defined by the NTSC weighted averaging method is used, it allows any color image received via the OS 13 from a common application software or determined by the OS 13 to be displayed favorably as a monochromatic image on the monochromatic display device 20A. Also, when the monochromatic display device 20A is connected to a common personal computer, it can display as a favorable monochromatic image any color image received from the common personal computer.

Third Embodiment

A third embodiment of the present invention is substantially identical to the first embodiment, except that the monochromatic image has an 11-bit gradation and the multi-gradation monochromatic image display 23 is capable of displaying a monochromatic image of gradation levels at 11 bits.

The monochromatic/color conversion software 12 is provided with such a monochromatic/color conversion table 1' as shown in FIG. 6 for converting the gradation level [x] of a monochromatic image at 11 bits ranging from 0 to 2047, received from a monochromatic image output software 11, into a set of the RGB values (r, g, b) at 3×8 bits ranging from (0, 0, 0) to (255, 255, 255).

As apparent from FIG. 6, the gradation levels [x] from 0 to 2047 are converted into different sets of the RGB values (r, g, b). Accordingly, the number of gradation levels in the monochromatic image will thus be 2048.

The color/monochromatic conversion processor 22 is provided with a re-conversion table, which is an inverse of the monochromatic/color conversion table 1" shown in FIG. 6, for converting the RGB values (r, g, b) of 3×8 bits ranging from (0, 0, 0) to (255, 255, 255) into a gradation level [x] of the monochromatic image of 11-bit gradation ranging from 0 to 2047. Accordingly, the number of gradation levels in the monochromatic image will thus be 2048.

A multi-gradation monochromatic image display device 100A of the third embodiment is hence capable of displaying a monochromatic image at multiple gradation levels (for example, 2048 levels) which exceed the gradation limit (for example, 256 levels) of the OS 13 without drastically modifying the hardware or software. In addition, a commercially available video card 14 can be employed.

The monochromatic/color conversion table 1" shown in FIG. 6 will be constructed by the following procedure.

Steps 1: The RGB values (r, g, b) corresponding to the gradation level [x] ranging from 0 to 2040 is first determined to satisfy the following equation. It should be noted that the values r, g, and b are selected so that no decimal fractions appear at the right side of the equation.

$$x=(r*5/16+g*9/16+b*2/16)*8$$

A monochromatic/color combination table 3 is shown in FIG. 7 where groups of the RGB values (r, g, b) are listed corresponding to the gradation level [x] ranging from 0 to 2040.

Step 2: A group of the RGB values (r, g, b) corresponding to the gradation level [x] ranging from 1792 to 2040 are assigned to 1799 to 2047 of the gradation level respectively.

Step 3: Another group of the RGB values (r, g, b) corresponding to the gradation level [x] ranging from 1536 to 1791 are assigned to 1542 to 1797 of the gradation level respectively.

Step 4: A further group of the RGB values (r, g, b) corresponding to the gradation level [x] ranging from 1280 to 1535 are assigned to 1285 to 1540 of the gradation level respectively.

Step 5: A still further group of the RGB values (r, g, b) corresponding to the gradation level [x] ranging from 1024 to 1279 are assigned to 1028 to 1283 of the gradation level respectively.

Step 6: A still further group of the RGB values (r, g, b) corresponding to the gradation level [x] ranging from 768 to 1023 are assigned to 771 to 1026 of the gradation level respectively.

Step 7: A still further group of the RGB values (r, g, b) corresponding to the gradation level [x] ranging from 512 to 767 are assigned to 514 to 769 of the gradation level respectively.

Step 8: A still further group of the RGB values (r, g, b) corresponding to the gradation level [x] ranging from 256 to 511 are assigned to 257 to 512 of the gradation level respectively.

Step 9: A still further group of the RGB values (r, g, b) corresponding to the gradation level [x] ranging from 0 to 255 are assigned to 0 to 255 of the gradation level respectively.

Step 10: The gradation level [x] of 256 is assigned with a set of the RGB values of, e.g., (33, 32, 29) which is intermediate between 255 and 256 of the gradation level [x] as determined by the equation shown at Step 1.

Step 11: The gradation level [x] of 513 is assigned with a set of the RGB values of, e.g., (65, 64, 61) which is intermediate between 511 and 512 of the gradation level [x] as determined by the equation shown at Step 1.

Step 12: The gradation level [x] of 770 is assigned with a set of the RGB values of, e.g., (97, 96, 93) which is intermediate between 767 and 768 of the gradation level [x] as determined by the equation shown at Step 1.

Step 13: The gradation level [x] of 1027 is assigned with a set of the RGB values of, e.g., (129, 128, 125) which is intermediate between 1023 and 1024 of the gradation level [x] as determined by the equation shown at Step 1.

Step 14: The gradation level [x] of 1284 is assigned with a set of the RGB values of, e.g., (161, 160, 157) which is intermediate between 1279 and 1280 of the gradation level [x] as determined by the equation shown at Step 1.

Step 15: The gradation level [x] of 1541 is assigned with a set of the RGB values of, e.g., (193, 192, 189) which is intermediate between 1535 and 1536 of the gradation level [x] as determined by the equation shown at Step 1.

Step 16: The gradation level [x] of 1798 is assigned with a set of the RGB values of, e.g., (224, 223, 228) which is intermediate between 1791 and 1792 of the gradation level [x] as determined by the equation shown at Step 1.

By conducting those steps, the monochromatic/color conversion table 1" shown in FIG. 6 is constructed. Since the color/monochromatic conversion defined by the NTSC weighted averaging method is used, it allows any color image received via the OS 13 from a common application software or determined by the OS 13 to be displayed favorably as a monochromatic image on the monochromatic display device 20A. Also, when the monochromatic display device 20A is connected to a personal computer, it can display as a monochromatic image any color image received from the personal computer.

Fourth Embodiment

Figure 8:
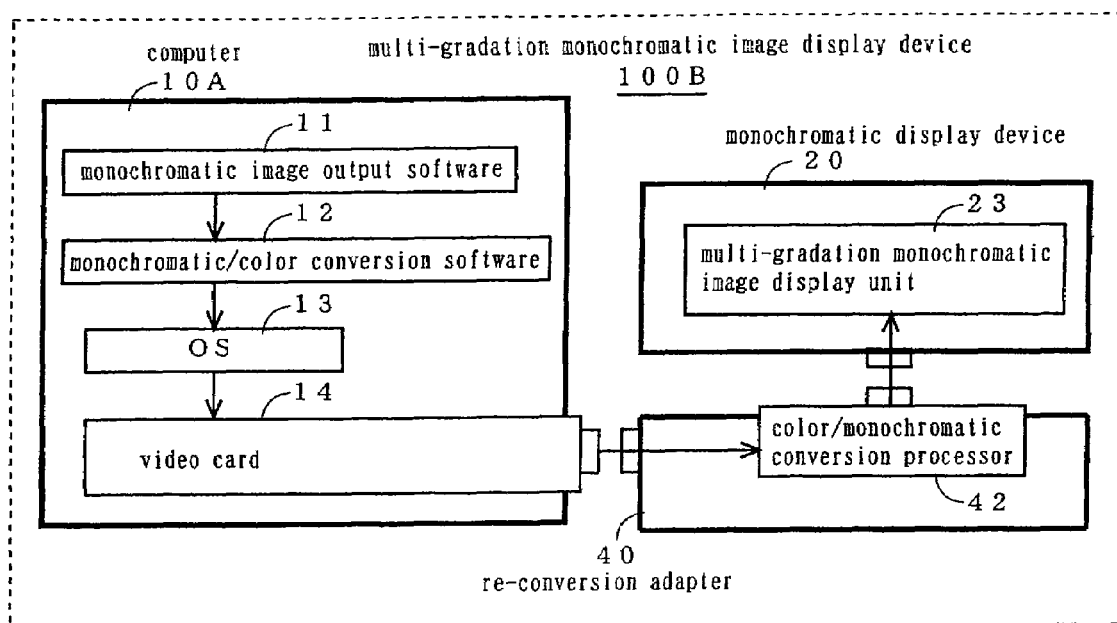
FIG. 8 is a structural block diagram of the multi-gradation monochromatic image display device (100B) showing a fourth embodiment of the present invention.

As shown in FIG. 8, a multi-gradation monochromatic image display device 100B of this embodiment comprises a computer 10A, a re-conversion adapter 40, and a monochromatic image display 20.

The computer 10A has such an arrangement as defined in the first to third embodiments.

The re-conversion adapter 40 includes a color/monochromatic conversion processor 42 for converting a received color image into a multi-gradation monochromatic image.

The color/monochromatic conversion processor 42 is identical in the arrangement to the color/monochromatic conversion processor 22 defined in the first to third embodiments.

The monochromatic image display 20 is of a common monochromatic image display type including a multi-gradation monochromatic image display unit 23 for displaying a monochromatic image of, e.g., 10-bit or 11-bit gradation.

The multi-gradation monochromatic image display device 100B of the fourth embodiment can thus display a monochromatic image at multiple gradation levels (for example, 1021 or 1024 or 2048 levels) which exceed the gradation limit of the OS 13 (for example, 256 levels) without drastically modifying the hardware or software. Also, it can employ common types of the video card 14 and the monochromatic image display 20.

Fifth Embodiment

Figure 9:
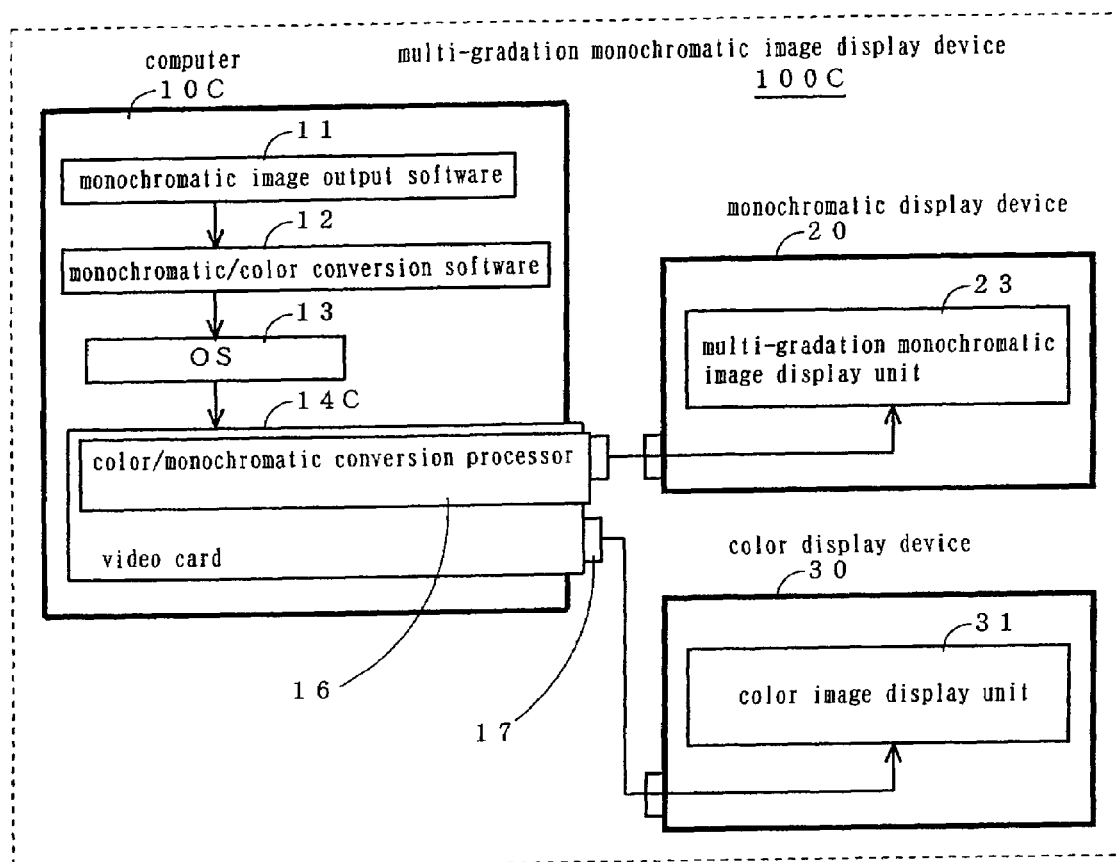
FIG. 9 is a structural block diagram of the multi-gradation monochromatic image display device (100C) showing a fifth embodiment of the present invention.

As shown in FIG. 9, a multi-gradation monochromatic image display device 100C of this embodiment comprises a computer 10C, a monochromatic image display 20, and a color image display 30.

The computer 1C has a video card 14C which replaces the video card 14 in the computer 10A defined in the first to third embodiments.

The video card 14C includes a color/monochromatic conversion processor 16 for converting a color image received from the OS 13 into a multi-gradation monochromatic image and a connector 17 for directly releasing a set of the RGB values (r, g, b) of a color image received from the OS 13. The monochromatic/color conversion processor 16 is identical in the arrangement to the monochromatic/color conversion processor 22 defined in the first to third embodiments.

The monochromatic image display 20 is of a common monochromatic display type including a multi-gradation monochromatic image display unit 23 for displaying a monochromatic image of, e.g., 10-bit or 11-bit gradation.

The color image display 30 is of a common color image display type including a color image display unit 31 for displaying a color image distributed by the re-conversion adapter 40.

The multi-gradation monochromatic image display device 100C of the fifth embodiment can thus display a monochromatic image at multiple gradation levels (for example, 1021 or 1024 or 2048 levels) which exceed the gradation limit of the OS 13 (for example, 256 levels) without drastically modifying the hardware or software. Also, it can employ a common type of the monochromatic image display 20.

Other Embodiments (1) The program defined in the first embodiment may be modified with m=8 and k=11 for constructing a monochromatic/color conversion table which is capable of converting a monochromatic image of 11-bit gradation into a color image having a number of colors at 3×8 bits. A re-conversion table can be constructed from the monochromatic/color conversion table.

(2) The program defined in the first embodiment may be modified with m=8 and k=12 while assigning R_PARAM, G_PARAM, and B_PARAM with five bits to establish R_PARAM=10/32, G_PARAM=20/32, and B_PARAM=2/32. Accordingly, a monochromatic/color conversion table for converting a monochromatic image of 12-bit gradation into a color image having a number of colors at 3×8 bits can be constructed from the program. Also, a re-conversion table can be constructed from the monochromatic/color conversion table.

(3) The function of the monochromatic/color conversion table may be replaced by converting the gradation level [x] in a multi-gradation monochromatic image into a set of the RGB values (r, g, b) in a color image with the use of an appropriate arithmetic formula. Also, the re-conversion table may be replaced by converting the RGB values (r, g, b) in a color image into the gradation level [x] in a monochromatic image with the use of an appropriate arithmetic formula.

(4) The monochromatic image output software 11 and the monochromatic/color conversion software 12 may be implemented by appropriate hardware arrangements.

(5) The color/monochromatic conversion processors 22, 42, and 16 may be implemented by either hardware or software arrangements.

INDUSTRIAL APPLICABILITY

The multi-gradation monochromatic image display method, the multi-gradation monochromatic image display device, the computer, the monochromatic display device, the re-conversion adapter, and the video card according to the present invention are capable of displaying a multi-gradation monochromatic image, which exceeds the gradation limit of an OS program without drastically modifying the hardware or software. In particular, the present invention is advantageous with the use of a personal computer which operates Windows as the OS program for processing a medical monochromatic image of 10-bit or more-bit gradation and displaying its multi-gradation monochromatic image.

What is claimed is:

1. A multi-gradation monochromatic image displaying method comprising:
   converting a monochromatic image, of which the number of gradation levels is greater than that of a monochromatic image viably handled by an operating system, into a color image;
   feeding the color image to the operating system of which the number of colors in a color image is greater than the number of gradation levels in a monochromatic image; and
   converting again the color image received from the operating system into a monochromatic image, of which the number of gradation levels is greater than that of the monochromatic image viably handled by the operating system, for display.

2. A multi-gradation monochromatic image displaying method according to claim 1, wherein when the gradation level [x] of the monochromatic image ranges from 0 to 1023 and the RGB values of the color image are r=0-255, g=0-255, and b=0-255, the relationship is given as:

$x=r\times 5/4+g\times 9/4+b\times 2/4$ at [x] ranging from 0 to 255, $r=63, g=63$, and $b=70$ at [x]=256, $x=r\times 5/4+g\times 9/4+b\times 2/4+1$ at [x] ranging from 257 to 512, $r=127, g=127$, and $b=134$ at [x]=513, $x=r\times 5/4+g\times 9/4+b\times 2/4+2$ at [x] ranging from 514 to 769, $r=191, g=191$, and $b=198$ at [x]=770, and $x=r\times 5/4+g\times 9/4+b\times 2/4+3$ at [x] ranging from 771 to 1023.

3. A multi-gradation monochromatic image displaying method according to claim 1, wherein when the gradation level [x] of the monochromatic image ranges from 0 to 2047 and the RGB values of the color image are r=0-255, g=0-255, and b=0-255, the relationship is given as:

$x=r\times 5/2+g\times 9/2+b\times 2/2$ at [x] ranging from 0 to 255, $r=33, g=32$, and $b=29$ at [x]=256, $x=r\times 5/2+g\times 9/2+b\times 2/2+1$ at [x] ranging from 257 to 512, $r=65, g=64$, and $b=61$ at [x]=513, $x=r\times 5/2+g\times 9/2+b\times 2/2+2$ at [x] ranging from 514 to 769, $r=97, g=96$, and $b=93$ at [x]=770, $x=r\times 5/2+g\times 9/2+b\times 2/2+3$ at [x] ranging from 771 to 1026, $r=129, g=128$, and $b=125$ at [x]=1027, $x=r\times 5/2+g\times 9/2+b\times 2/2+4$ at [x] ranging from 1028 to 1283, $r=161, g=160$, and $b=157$ at [x]=1284, $x=r\times 5/2+g\times 9/2+b\times 2/2+5$ at [x] ranging from 1285 to 1540, $r=193, g=192$, and $b=189$ at [x]=1541, $x=r\times 5/2+g\times 9/2+b\times 2/2+6$ at [x] ranging from 1542 to 1797, $r=224, g=223$, and $b=228$ at [x]=1798, and $x=r\times 5/2+g\times 9/2+b\times 2/2+7$ at [x] ranging from 1799 to 2047.

4. A multi-gradation monochromatic image display device comprising:
   a computer which includes an operating system where the number of colors of a color image is greater than the number of gradation levels of a monochromatic image,
   a monochromatic image outputting device for outputting a monochromatic image of which the number of gradation levels is greater than that of a monochromatic image viably handled by the operating system, a monochromatic/color converting device for converting the multi-gradation monochromatic image released from the monochromatic image outputting device into a color image which is then received by the operating system,
   a video card for releasing the digital data of the color image released from the operating system, and
   a monochromatic display device comprising a color/monochromatic converting device for converting again the color image received from the video card into a monochromatic image of which the number of gradation levels is greater than that of the monochromatic image viably handled by the operating system and a multi-gradation monochromatic image displaying device for displaying the monochromatic image at multiple gradation levels.

5. A multi-gradation monochromatic image display device comprising:
   a computer which includes an operating system where the number of colors of a color image is greater than the number of a gradation levels of a monochromatic image, a monochromatic image outputting device for outputting a monochromatic image of which the number of gradation levels is greater than that of a monochromatic image viably handled by the operating system, a monochromatic/color converting device for converting the multi-gradation monochromatic image released from the monochromatic image outputting device into a color image which is then received by the operating system, a video card for releasing the digital data of the color image released from the operating system, a re-conversion adapter comprising a color/monochromatic converting device for converting again the color image received from the video card into a monochromatic image of which the number of gradation levels is greater than that of the monochromatic image viably handled by the operating system, and a monochromatic display device comprising a multi-gradation monochromatic image displaying device for displaying the monochromatic image at multiple gradation levels received from the re-conversion adapter.

6. A multi-gradation monochromatic image display device comprising:

a computer which includes an operating system where the number of colors of a color image is greater than the number of gradation levels of a monochromatic image, a monochromatic image outputting device for outputting a monochromatic image of which the number of gradation levels is greater than that of a monochromatic image viably handled by the operating system, a monochromatic/color converting device for converting the multi-gradation monochromatic image released from the monochromatic image outputting device into a color image which is then received by the operating system, a video card provided with a color/monochromatic converting device, which converts again the color image received from the operating system into a monochromatic image of which the number of gradation levels is greater than that of the monochromatic image viably handled by the operating system, for releasing the digital data of the monochromatic image at multiple gradation levels re-converted from the color image, and a monochromatic display device comprising a multi-gradation monochromatic image displaying device for displaying the monochromatic image at multiple gradation levels released from the video card.

7. A multi-gradation monochromatic image display device according to any of claims 4 to 6, wherein when the gradation level [x] of the monochromatic image ranges from 0 to 1023 and the RGB values of the color image are r=0-255, g=0-255, and b=0-255, the relationship is given as $x=r\times 5/4+g\times 9/4+b\times 2/4$ at $[x]$ ranging from 0 to 255, $r=63, g=63,$ and $b=70$ at $[x]=256,$ $x=r\times 5/4+g\times 9/4+b\times 2/4+1$ at $[x]$ ranging from 257 to 512, $r=127, g=127,$ and $b=134$ at $[x]=513,$ $x=r\times 5/4+g\times 9/4+b\times 2/4+2$ at $[x]$ ranging from 514 to 769, $r=191, g=191,$ and $b=198$ at $[x]=770,$ and $x=r\times 5/4+g\times 9/4+b\times 2/4+3$ at $[x]$ ranging from 771 to 1023.

8. A multi-gradation monochromatic image display device according to claim 7, wherein the monochromatic/color converting device is arranged for converting the gradation level [x] of a multi-gradation monochromatic image into a set of the RGB values of a color image with the use of a table or arithmetic formula.

9. A multi-gradation monochromatic image display device according to claim 7, wherein the monochromatic/color converting device is contained in the monochromatic image outputting device.

10. A multi-gradation monochromatic image display device according to any of claims 4 to 6, wherein when the gradation level [x] of the monochromatic image ranges from 0 to 2047 and the RGB values of the color image are r=0-255, g=0-255, and b=0-255, the relationship is given as $x=r\times 5/2+g\times 9/2+b\times 2/2$ at $[x]$ ranging from 0 to 255, $r=33, g=32,$ and $b=29$ at $[x]=256,$ $x=r\times 5/2+g\times 9/2+b\times 2/2+1$ at $[x]$ ranging from 257 to 512, $r=65, g=64,$ and $b=61$ at $[x]=513,$ $x=r\times 5/2+g\times 9/2+b\times 2/2+2$ at $[x]$ ranging from 514 to 769, $r=97, g=96,$ and $b=93$ at $[x]=770,$ $x=r\times 5/2+g\times 9/2+b\times 2/2+3$ at $[x]$ ranging from 771 to 1026, $r=129, g=128,$ and $b=125$ at $[x]=1027,$ $x=r\times 5/2+g\times 9/2+b\times 2/2+4$ at $[x]$ ranging from 1028 to 1283, $r=161, g=160,$ and $b=157$ at $[x]=1284,$ $x=r\times 5/2+g\times 9/2+b\times 2/2+5$ at $[x]$ ranging from 1285 to 1540, $r=193, g=192,$ and $b=189$ at $[x]=1541,$ $x=r\times 5/2+g\times 9/2+b\times 2/2+6$ at $[x]$ ranging from 1542 to 1797, $r=224, g=223,$ and $b=228$ at $[x]=1798,$ and $x=r\times 5/2+g\times 9/2+b\times 2/2+7$ at $[x]$ ranging from 1799 to 2047.

11. A multi-gradation monochromatic image display device according to claim 10, wherein the monochromatic/color converting device is arranged for converting the gradation level [x] of a multi-gradation monochromatic image into a set of the RGB values of a color image with the use of a table or arithmetic formula.

12. A multi-gradation monochromatic image display device according claim 10, wherein the monochromatic/color converting device is contained in the monochromatic image outputting device.

13. A multi-gradation monochromatic image display device according to any of claims 4 to 6, wherein the monochromatic/color converting device is arranged for converting the gradation level [x] of a multi-gradation monochromatic image into a set of the RGB values of a color image with the use of a table or arithmetic formula.

14. A multi-gradation monochromatic image display device according to claim 13, wherein the monochromatic/color converting device is contained in the monochromatic image outputting device.

15. A multi-gradation monochromatic image display device according to any of claims 4 to 6, wherein the monochromatic/color converting device is contained in the monochromatic image outputting device.

16. A computer comprising:

an operating system where the number of colors of a color image is greater than the number of gradation levels of a monochromatic image;

a monochromatic image outputting device for outputting a monochromatic image of which the number of gradation levels is greater than that of a monochromatic image viably handled by the operating system;

a monochromatic/color converting device for converting the multi-gradation monochromatic image released from the monochromatic image outputting device into a color image which is then received by the operating system; and a video card provided with a color/monochromatic converting device, which converts again the color image received from the operating system into a monochromatic image of which the number of gradation levels is greater than that of the monochromatic image viably handled by the operating system, for releasing the digital data of the monochromatic image at multiple gradation levels re-converted from the color image.

17. A computer according to claim 16, wherein when the gradation level [x] of the monochromatic image ranges from 0 to 1023 and the RGB values of the color image are r=0-255, g=0-255, and b=0-255, the relationship is given as $$x = r \times 5/4 + g \times 9/4 + b \times 2/4 \text{ at } [x] \text{ ranging from 0 to 255,}$$
$$r=63, g=63, \text{ and } b=70 \text{ at } [x]=256,$$

$$x = r \times 5/4 + g \times 9/4 + b \times 2/4 + 1 \text{ at } [x] \text{ ranging from 257 to 512,}$$
$$r=127, g=127, \text{ and } b=134 \text{ at } [x]=513,$$

$$x = r \times 5/4 + g \times 9/4 + b \times 2/4 + 2 \text{ at } [x] \text{ ranging from 514 to 769,}$$
$$r=191, g=191, \text{ and } b=198 \text{ at } [x]=770, \text{ and}$$

$$x = r \times 5/4 + g \times 9/4 + b \times 2/4 + 3 \text{ at } [x] \text{ ranging from 771 to 1023.}$$

18. A computer according to claim 16, wherein when the gradation level [x] of the monochromatic image ranges from 0 to 2047 and the RGB values of the color image are r=0-255, g=0-255, and b=0-255, the relationship is given as $$x = r \times 5/2 + g \times 9/2 + b \times 2/2 \text{ at } [x] \text{ ranging from 0 to 255,}$$
$$r=33, g=32, \text{ and } b=29 \text{ at } [x]=256,$$

$$x = r \times 5/2 + g \times 9/2 + b \times 2/2 + 1 \text{ at } [x] \text{ ranging from 257 to 512,}$$
$$r=65, g=64, \text{ and } b=61 \text{ at } [x]=513,$$

$$x = r \times 5/2 + g \times 9/2 + b \times 2/2 + 2 \text{ at } [x] \text{ ranging from 514 to 769,}$$
$$r=97, g=96, \text{ and } b=93 \text{ at } [x]=770,$$

$$x = r \times 5/2 + g \times 9/2 + b \times 2/2 + 3 \text{ at } [x] \text{ ranging from 771 to 1026,}$$
$$r=129, g=128, \text{ and } b=125 \text{ at } [x]=1027,$$

$$x = r \times 5/2 + g \times 9/2 + b \times 2/2 + 4 \text{ at } [x] \text{ ranging from 1028 to 1283,}$$
$$r=161, g=160, \text{ and } b=157 \text{ at } [x]=1284,$$

$$x = r \times 5/2 + g \times 9/2 + b \times 2/2 + 5 \text{ at } [x] \text{ ranging from 1285 to 1540,}$$
$$r=193, g=192, \text{ and } b=189 \text{ at } [x]=1541,$$

$$x = r \times 5/2 + g \times 9/2 + b \times 2/2 + 6 \text{ at } [x] \text{ ranging from 1542 to 1797,}$$
$$r=224, g=223, \text{ and } b=228 \text{ at } [x]=1798, \text{ and}$$

$$x = r \times 5/2 + g \times 9/2 + b \times 2/2 + 7 \text{ at } [x] \text{ ranging from 1799 to 2047.}$$

19. A computer according to any of claims 16 to 18, wherein the monochromatic/color converting device is arranged for converting the gradation level [x] of a multi-gradation monochromatic image into a set of the RGB values of a color image with the use of a table or arithmetic formula.

20. A computer according to claim 19, wherein the monochromatic/color converting device is contained in the monochromatic image outputting device.

21. A computer according to any of claims 16 to 18, wherein the monochromatic/color converting device is contained in the monochromatic image outputting device.

22. A monochromatic display device comprising a color/monochromatic converting device for converting a color image received into a multi-gradation monochromatic image and a multi-gradation monochromatic image displaying device for displaying the multi-gradation monochromatic image converted from the color image, in which the color/monochromatic converting device is arranged in that when the RGB values of the color image are r=0-255, g=0-255, and b=0-255, the gradation level [x] of the monochromatic image which ranges from 0 to 1023 is expressed by $$[x] = r \times 5/4 + g \times 9/4 + b \times 2/4 \text{ at } 0 \leq r \times 5/4 + g \times 9/4 + b \times 2/4 \leq 255,$$

$$[x]=256 \text{ at } r=63, g=63, \text{ and } b=70, [x] = r \times 5/4 + g \times 9/4 + b \times 2/4 + 1 \text{ at } 257 \leq r \times 5/4 + g \times 9/4 + b \times 2/4 + 1 \leq 512,$$

$$[x]=513 \text{ at } r=127, g=127, \text{ and } b=134,$$

$$[x] = r \times 5/4 + g \times 9/4 + b \times 2/4 + 2 \text{ at } 514 \leq r \times 5/4 + g \times 9/4 + b \times 2/4 + 2 \leq 769,$$

$$[x]=770 \text{ at } r=191, g=191, \text{ and } b=198, \text{ and}$$

$$[x] = r \times 5/4 + g \times 9/4 + b \times 2/4 + 3 \text{ at } 771 \leq r \times 5/4 + g \times 9/4 + b \times 2/4 + 3 \leq 1023; \text{ and}$$

the gradation level [x] is applied to said display device o produce an image on said display device.

23. A monochromatic display device comprising a color/monochromatic converting device for converting a color image received into a multi-gradation monochromatic image and a multi-gradation monochromatic image displaying device for displaying the multi-gradation monochromatic image converted from the color image, in which the color/monochromatic converting device is arranged in that when the RGB values of the color image are r=0-255, g=0-255, and b=0-255, the gradation level [x] of the monochromatic image which ranges from 0 to 2047 is expressed by:

$$[x] = r \times 5/2 + g \times 9/2 + b \times 2/2 \text{ at } 0 \leq r \times 5/2 + g \times 9/2 + b \times 2/2 \leq 255,$$

$$[x]=256 \text{ at } r=33, g=32, \text{ and } b=29,$$

$$[x] = r \times 5/2 + g \times 9/2 + b \times 2/2 + 1 \text{ at } 257 \leq r \times 5/2 + g \times 9/2 + b \times 2/2 + 1 \leq 512,$$

$$[x]=513 \text{ at } r=65, g=64, \text{ and } b=61,$$

$$[x] = r \times 5/2 + g \times 9/2 + b \times 2/2 + 2 \text{ at } 514 \leq r \times 5/2 + g \times 9/2 + b \times 2/2 + 2 \leq 769,$$

$$[x]=770 \text{ at } r=97, g=96, \text{ and } b=93,$$

$$[x] = r \times 5/2 + g \times 9/2 + b \times 2/2 + 3 \text{ at } 771 \leq r \times 5/2 + g \times 9/2 + b \times 2/2 + 3 \leq 1026,$$

$$[x]=1027 \text{ at } r=129, g=128, \text{ and } b=125,$$

$$[x] = r \times 5/2 + g \times 9/2 + b \times 2/2 + 4 \text{ at } 1028 \leq r \times 5/2 + g \times 9/2 + b \times 2/2 + 4 \leq 1283,$$

$$[x]=1284 \text{ at } r=161, g=160, \text{ and } b=157,$$

$$[x] = r \times 5/2 + g \times 9/2 + b \times 2/2 + 5 \text{ at } 1285 \leq r \times 5/2 + g \times 9/2 + b \times 2/2 + 5 \leq 1540,$$

$$[x]=1541 \text{ at } r=193, g=192, \text{ and } b=189,$$

$$[x] = r \times 5/2 + g \times 9/2 + b \times 2/2 + 6 \text{ at } 1542 \leq r \times 5/2 + g \times 9/2 + b \times 2/2 + 6 \leq 1797,$$

$$[x]=1798 \text{ at } r=224, g=223, \text{ and } b=228,$$

$$[x] = r \times 5/2 + g \times 9/2 + b \times 2/2 + 7 \text{ at } 1799 \leq r \times 5/2 + g \times 9/2 + b \times 2/2 + 7 \leq 2047; \text{ and}$$

the gradation level [x] is applied to said displayed device to produce an image on said display device.

24. A monochromatic display device according to claim 22 or 23, wherein the color/monochromatic converting device is arranged for converting the RGB values of a color image into a gradation level [x] of a multi-gradation monochromatic image with the use of a table or arithmetic formula.

25. A re-conversion adapter for driving a display device to produce an image, comprising a color/monochromatic converting device for converting a color image received into a multi-gradation monochromatic image, in which the color/monochromatic converting device is arranged in that when the RGB values of the color image are r=0-255, g=0-255, and b=0-255, the gradation level [x] of the monochromatic image which ranges from 0 to 1023 is expressed by:

$$[x]=r\times5/4+g\times9/4+b\times2/4 \text{ at } 0\leq r\times5/4+g\times9/4+b\times2/4\leq255,$$

$$[x]=256 \text{ at } r=63, g=63, \text{ and } b=70,$$

$$[x]=r\times5/4+g\times9/4+b\times2/4+1 \text{ at } 257\leq r\times5/4+g\times9/4+b\times2/4+1\leq512,$$

$$[x]=513 \text{ at } r=127, g=127, \text{ and } b=134,$$

$$[x]=r\times5/4+g\times9/4+b\times2/4+2 \text{ at } 514\leq r\times5/4+g\times9/4+b\times2/4+2\leq769,$$

$$[x]=770 \text{ at } r=191, g=191, \text{ and } b=198, \text{ and}$$

$$[x]=r\times5/4+g\times9/4+b\times2/4+3 \text{ at } 771\leq r\times5/4+g\times9/4+b\times2/4+3\leq1023; \text{ and}$$

the gradation level [x] being configured in an output to drive said display device to produce an image on said display device.

26. A re-conversion adapter for driving a display device to produce an image, comprising a color/monochromatic converting device for converting a color image received into a multi-gradation monochromatic image, in which the color/monochromatic converting device is arranged in that when the RGB values of the color image are r=0-255, g=0-255, and b=0-255, the gradation level [x] of the monochromatic image which ranges from 0 to 2047 is expressed by:

$$[x]=r\times5/2+g\times9/2+b\times2/2 \text{ at } 0\leq r\times5/2+g\times9/2+b\times2/2\leq255,$$

$$[x]=256 \text{ at } r=33, g=32, \text{ and } b=29,$$

$$[x]=r\times5/2+g\times9/2+b\times2/2+1 \text{ at } 257\leq r\times5/2+g\times9/2+b\times2/2+1\leq512,$$

$$[x]=513 \text{ at } r=65, g=64, \text{ and } b=61,$$

$$[x]=r\times5/2+g\times9/2+b\times2/2+2 \text{ at } 514\leq r\times5/2+g\times9/2+b\times2/2+2\leq769,$$

$$[x]=770 \text{ at } r=97, g=96, \text{ and } b=93,$$

$$[x]=r\times5/2+g\times9/2+b\times2/2+3 \text{ at } 771\leq r\times5/2+g\times9/2+b\times2/2+3\leq1026,$$

$$[x]=1027 \text{ at } r=129, g=128, \text{ and } b=125,$$

$$[x]=r\times5/2+g\times9/2+b\times2/2+4 \text{ at } 1028\leq r\times5/2+g\times9/2+b\times2/2+4\leq1283,$$

$$[x]=1284 \text{ at } r=161, g=160, \text{ and } b=157,$$

$$[x]=r\times5/2+g\times9/2+b\times2/2+5 \text{ at } 1285\leq r\times5/2+g\times9/2+b\times2/2+5\leq1540,$$

$$[x]=1541 \text{ at } r=193, g=192, \text{ and } b=189,$$

$$[x]=r\times5/2+g\times9/2+b\times2/2+6 \text{ at } 1542\leq r\times5/2+g\times9/2+b\times2/2+6\leq1797,$$

$$[x]=1798 \text{ at } r=224, g=223, \text{ and } b=228, \text{ and}$$

$$[x]=r\times5/2+g\times9/2+b\times2/2+7 \text{ at } 1799\leq r\times5/2+g\times9/2+b\times2/2+7\leq2047; \text{ and}$$

the gradation level [x] being configured in an output to drive said display device to produce an image on display device.

27. A re-conversion adapter according to claim 25 or 26, wherein the color/monochromatic converting device is arranged for converting the RGB values of a color image into a gradation level [x] of a multi-gradation monochromatic image with the use of a table or arithmetic formula.

28. A video card comprising a color/monochromatic converting device arranged for converting again the color image received from an operating system into a monochromatic image of which the number of gradation levels is greater than that of the monochromatic image viably handled by the operating system so that the digital data of the monochromatic image at multiple gradation levels re-converted from the color image can be released.

29. A video card according to claim 28, wherein the color/monochromatic converting device is arranged in that when the RGB values of the color image are r=0-255, g=0-255, and b=0-255, the gradation level [x] of the monochromatic image which ranges from 0 to 1023 is expressed by:

$$[x]=r\times5/4+g\times9/4+b\times2/4 \text{ at } 0\leq r\times5/4+g\times9/4+b\times2/4\leq255,$$

$$[x]=256 \text{ at } r=63, g=63, \text{ and } b=70,$$

$$[x]=r\times5/4+g\times9/4+b\times2/4+1 \text{ at } 257\leq r\times5/4+g\times9/4+b\times2/4+1\leq512,$$

$$[x]=513 \text{ at } r=127, g=127, \text{ and } b=134,$$

$$[x]=r\times5/4+g\times9/4+b\times2/4+2 \text{ at } 514\leq r\times5/4+g\times9/4+b\times2/4+2\leq769,$$

$$[x]=770 \text{ at } r=191, g=191, \text{ and } b=198, \text{ and}$$

$$[x]=r\times5/4+g\times9/4+b\times2/4+3 \text{ at } 771\leq r\times5/4+g\times9/4+b\times2/4+3\leq1023.$$

30. A video card according to claim 28, wherein the color/monochromatic converting device is arranged in that when the RGB values of the color image are r=0-255, g=0-255, and b=0-255, the gradation level [x] of the monochromatic image which ranges from 0 to 2047 is expressed by:

$$[x]=r\times5/2+g\times9/2+b\times2/2 \text{ at } 0\leq r\times5/2+g\times9/2+b\times2/2\leq255,$$

$$[x]=256 \text{ at } r=33, g=32, \text{ and } b=29,$$

$$[x]=r\times5/2+g\times9/2+b\times2/2+1 \text{ at } 257\leq r\times5/2+g\times9/2+b\times2/2+1\leq512,$$

$$[x]=513 \text{ at } r=65, g=64, \text{ and } b=61,$$

$$[x]=r\times5/2+g\times9/2+b\times2/2+2 \text{ at } 514\leq r\times5/2+g\times9/2+b\times2/2+2\leq769,$$

$$[x]=770 \text{ at } r=97, g=96, \text{ and } b=93,$$

$$[x]=r\times5/2+g\times9/2+b\times2/2+3 \text{ at } 771\leq r\times5/2+g\times9/2+b\times2/2+3\leq1026,$$

$$[x]=1027 \text{ at } r=129, g=128, \text{ and } b=125,$$

$[x] = r\times5/2+g\times9/2+b\times2/2+4$ at $1028 \leq r\times5/2+g\times9/2+b\times2/2+4 \leq 1283$, $[x]=1284$ at $r=161$, $g=160$, and $b=157$, $[x] = r\times5/2+g\times9/2+b\times2/2+5$ at $1285 \leq r\times5/2+g\times9/2+b\times2/2+5 \leq 1540$, $[x]=1541$ at $r=193$, $g=192$, and $b=189$, $[x] = r\times5/2+g\times9/2+b\times2/2+6$ at $1542 \leq r\times5/2+g\times9/2+b\times2/2+6 \leq 1797$, $[x]=1798$ at $r=224$, $g=223$, and $b=228$, and $[x] = r\times5/2+g\times9/2+b\times2/2+7$ at $1799 \leq r\times5/2+g\times9/2+b\times2/2+7 \leq 2047$.

31. A video card according to any of claims 28 to 30, wherein the color/monochromatic converting device is arranged for converting the RGB values of a color image into a gradation level [x] of a multi-gradation monochromatic image with the use of a table or arithmetic formula.

* * * * *